Sept. 20, 1927.
B. R. BENJAMIN ET AL
TRACTOR HARVESTER
Filed Nov. 15, 1919
1,643,149
4 Sheets-Sheet 4
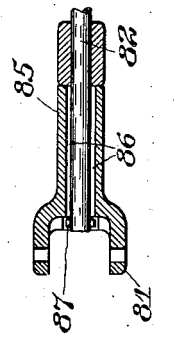
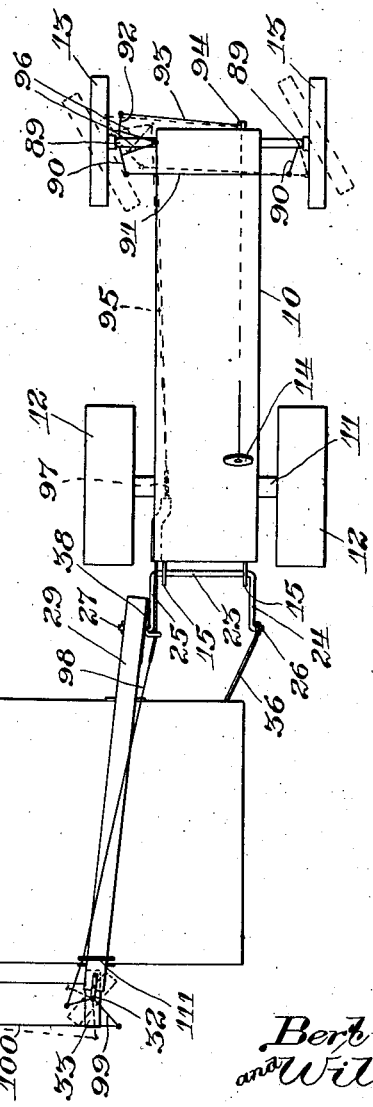
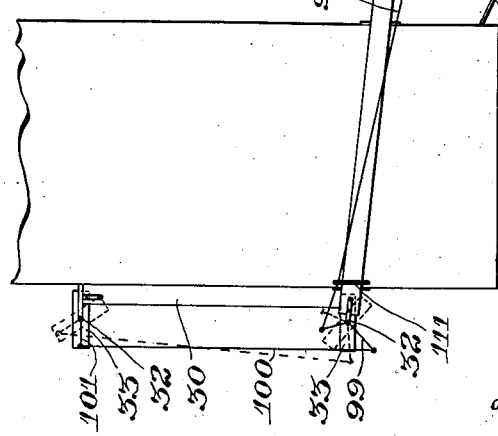
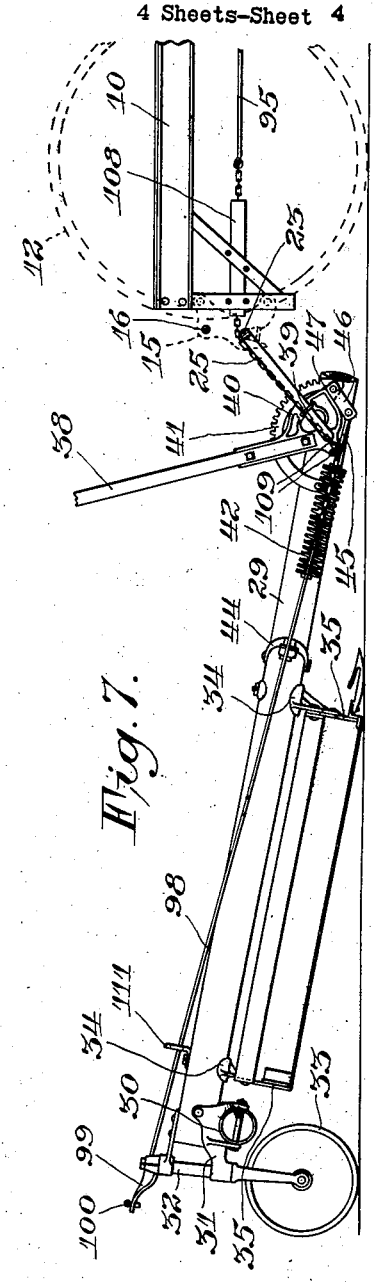
Inventors:
Bert R. Benjamin
and William Webber,
By John P. Smith.
Atty.

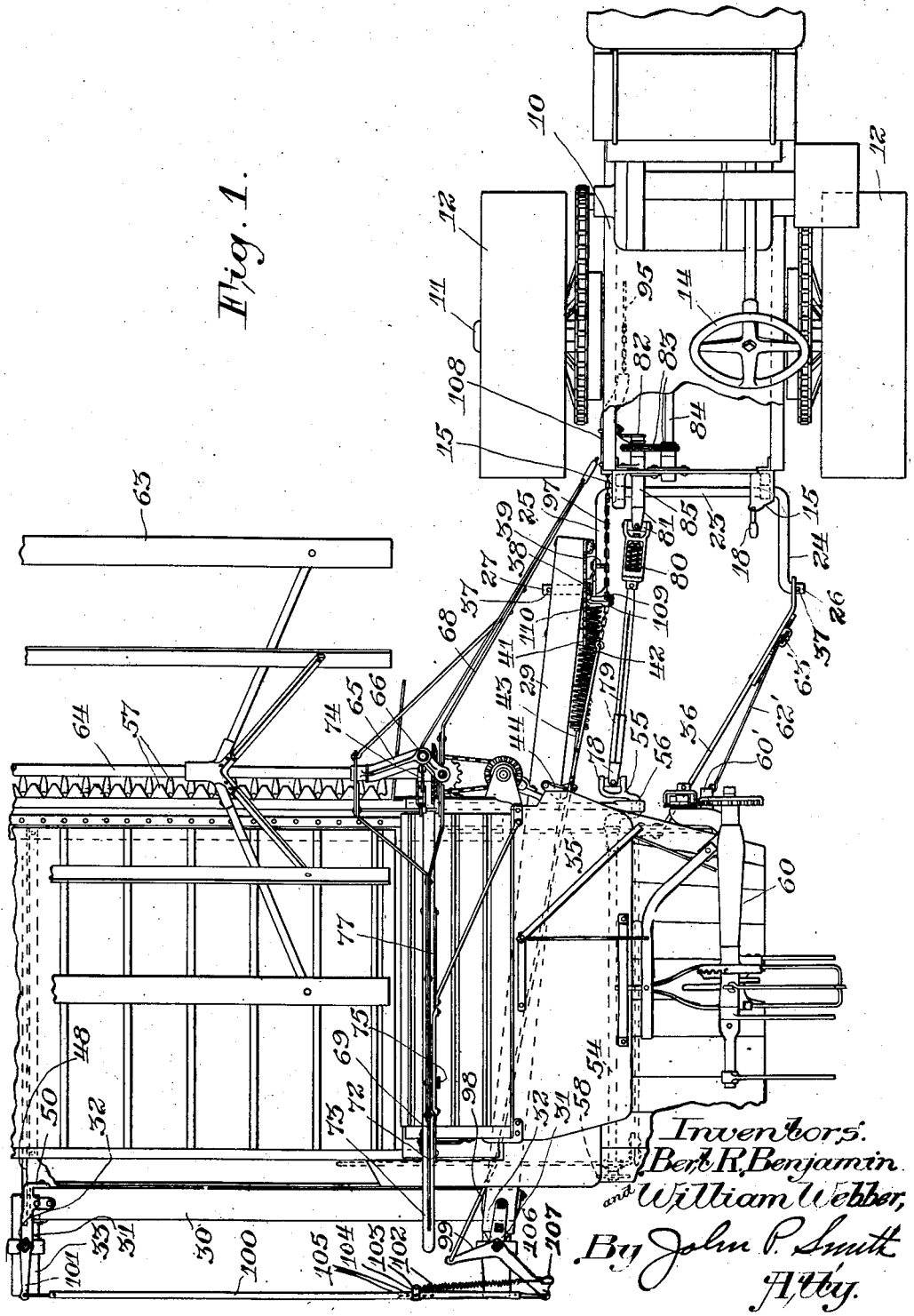

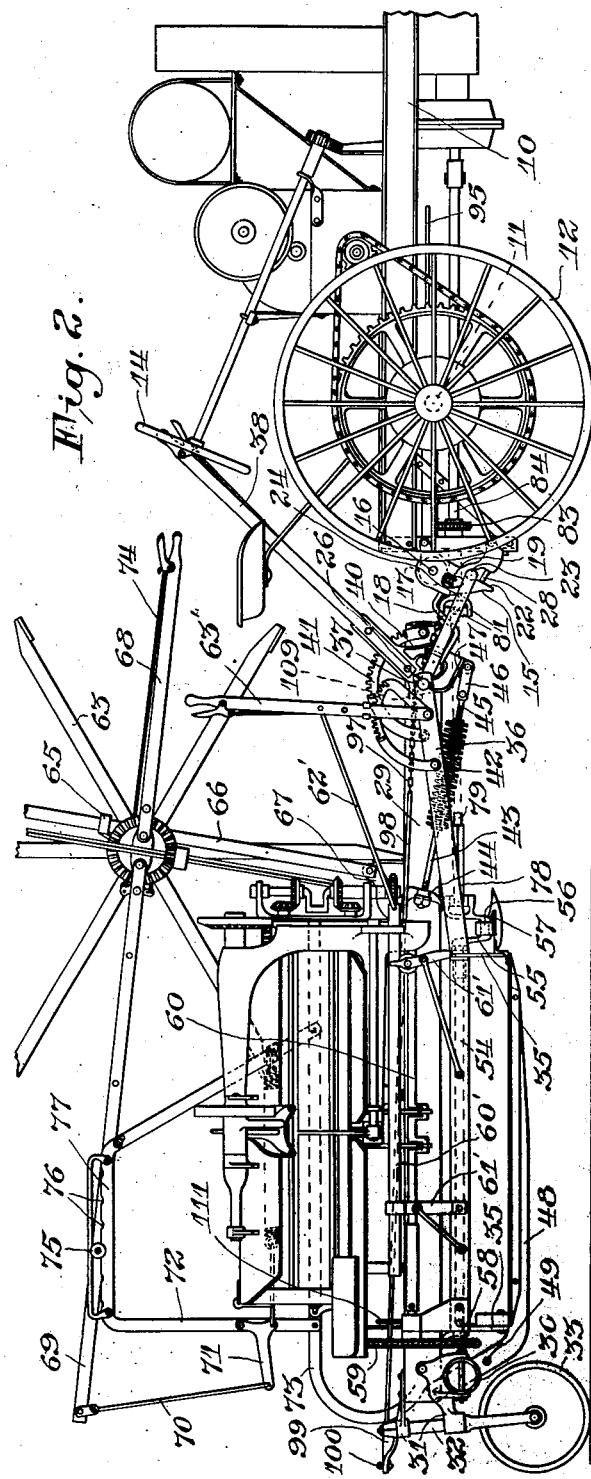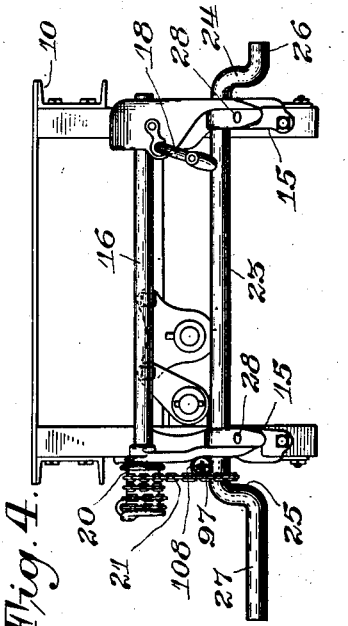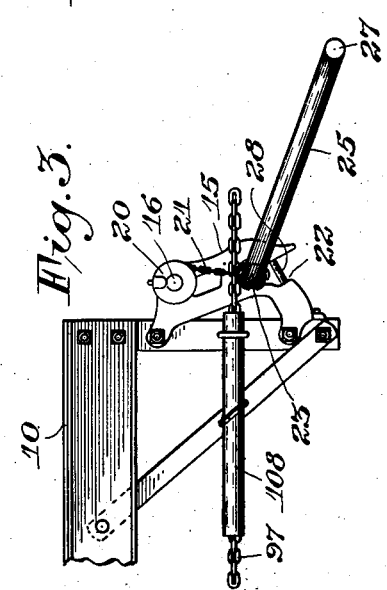

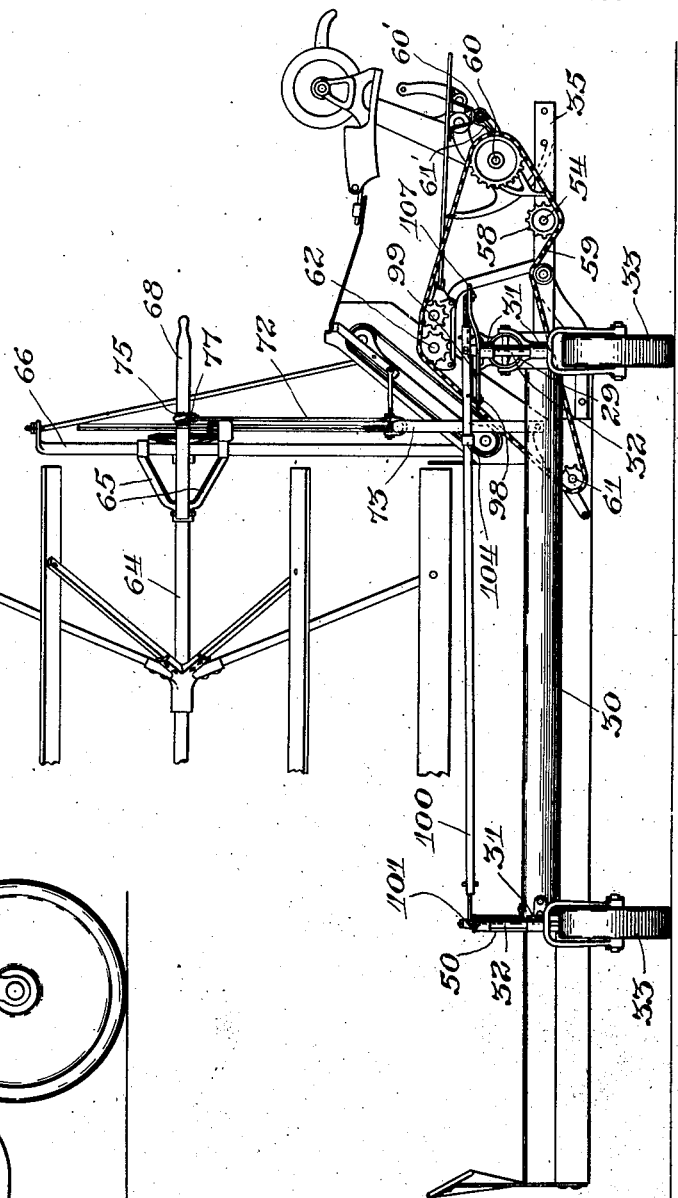

Patented Sept. 20, 1927.

1,643,149

UNITED STATES PATENT OFFICE.

BERT R. BENJAMIN, OF OAK PARK, AND WILLIAM WEBBER, OF LA GRANGE, ILLINOIS, ASSIGNORS TO INTERNATIONAL HARVESTER COMPANY, A CORPORATION OF NEW JERSEY.

TRACTOR HARVESTER.

Application filed November 15, 1919. Serial No. 338,169.

This invention relates to implements such as harvesters, and more particularly to harvester or implement attachments for motor-propelled vehicles or tractors.

At the present time, the use of tractors for propelling and operating farm implements is becoming more and more common, and one of the problems that confronts farm implement manufacturers is how best to adapt their implements for tractor propulsion and operation.

There are several important factors to be considered in connection with this problem, among them, the ease with which the implement and the tractor can be connected together and disconnected from each other, aid the operation of the combined machine with a minimum amount of help. It is also advisable to eliminate as far as possible the unnecessary parts of the harvester implements by supporting the implement partially on the frame of the tractor, since by eliminating unnecessary parts, such as the bull wheels of the harvester, the weight of the implement is materially cut down, and therefore the cost is decreased.

The present invention has been worked out with the above mentioned problems in mind, and the invention has for its objects to adapt harvester implements for tractor propulsion and operation; to eliminate as far as possible unnecessary parts from the implement, thereby cutting down the weight; to provide for the adjustment of the various parts of the implement from the tractor; to provide a supporting and coupling construction on the tractor so designed that the implement and the tractor may be connected together and disconnected from each other with a minimum expenditure of time and labor; to so connect the tractor with the implement that the steering mechanism of the tractor will automatically control the steering of the harvester; and to provide compensating mechanism between the tractor and the implement so constructed and arranged that the tilting of the implement will not throw out of adjustment the steering connection between the tractor and the implement.

In order to carry out the objects above stated, we have designed an implement attachment for tractors and coupling mechanism between the tractor and the implement which may be described briefly as follows:

In the present instance, the implement is attached to the rear end of the frame of the tractor, the tractor frame being provided with means for supporting and retaining coupling mechanism which is connected between the tractor and the implement. Means have also been provided on the tractor for lifting the front end of the implement frame in order to properly position the frame for engagement with the means carried by the tractor frame for supporting and engaging the coupling means. The coupling means illustrated comprise a crank, the crank shaft of which is pivoted on the supporting means carried by the tractor frame and the crank arms being in turn pivoted on the implement frame; and the tilting mechanism for the implement in the form of the invention illustrated comprises a lever mechanism carried by the implement and engaging one of the crank arms of the coupling means. The implement illustrated is supported at its front end on the coupling means and at its rear end on the supporting wheels which also act as steering wheels. The tractor is provided with the usual steering mechanism, and this tractor steering mechanism is operatively connected with the steering mechanism carried by the implement, and means is also provided for correcting the connections between the tractor steering mechanism and the implement steering mechanism when the implement is tilted about the steering and supporting wheels and on the coupling means which connects the implement to the tractor. Various other features have also been incorporated in the improved construction, such as cushioning means for the implement, improved means for adjusting the binding mechanism on the implement and the reel mechanism from the operator's seat on the tractor, and improved means for coupling the tractor power shaft with the implement drive shaft. These detail features, however, will be described more fully in the specification and need not be mentioned further in this brief statement of the invention, With the above noted objects in view, and with further objects which will appear as the description proceeds, we have illustrated in the drawings one practical embodiment of the invention, and in these drawings, Fig. 1 is a top plan view showing our improved tractor implement combination;

Fig. 2 is a side elevation of the construction shown in Fig. 1.

Figs. 3 and 4 illustrate in side elevation and rear elevation the coupling mechanism for connecting the harvester implement to the tractor;

Fig. 5 is a rear elevation of the harvester;

Fig. 6 is a side elevation showing the adjustable connection between the harvester platform supporting mechanism and one of the supporting and steering wheels of the harvester;

Fig. 7 is a side elevation illustrating the tilting mechanism for the harvester, and the compensating mechanism for the steering connection between the harvester and the tractor;

Figs. 8 and 9 illustrate an end elevation and section of shaft coupling for connecting the power transmission shaft of the harvester to the power driven shaft of the tractor; and Fig. 10 is a diagrammatic top plan view illustrating the connections between the tractor steering wheels and the harvester steering wheels.

In the embodiment of the invention illustrated in the drawings, we have shown a grain binder combined with the tractor and the coupling mechanism or draft connections between the two machines and the operative driving connections for the binder. It should be understood, however, that this particular form of implement has been shown merely for the purpose of illustrating a practical embodiment of the invention, and that the invention is equally well adapted for connecting other implements with a tractor.

The tractor in connection with which our invention is illustrated is a conventional design, having a frame 10 mounted at its rear end on an axle 11 carried by the main traction wheels 12, the frame being supported at its front end on a pair of supporting and guiding wheels 13 which are connected in the usual manner with the steering mechanism, such as steering wheel 14. The frame 10 of the tractor is provided at its rear end with rearwardly extending brackets 15, a shaft 16 being journaled in the upper portions of these brackets and being provided with a worm wheel 17 at one end thereof. See Figs. 2, 3 and 4. A crank 18 is rotatably mounted in one of the brackets 15, and is provided with a worm 19 which meshes with the worm wheel 17, above described. Shaft 16 has secured thereto at the end opposite the worm wheel 17 a drum 20 which in turn has secured thereto one end of a cable or chain 21. The brackets 15 are bifurcated at their lower ends, as shown at 22, these bifurcated lower portions being adapted to receive and guide a shaft 23 having crank arms 24—25, the crank arms having outwardly extending end portions 26—27 which are pivotally connected to the frame of the harvester in a manner hereinafter described. The chain 21 is looped at its free end around the shaft 23, as illustrated in Figs. 3 and 4, and when the operator desires to couple the harvester to the tractor, the chain is attached to the shaft 23, and the crank 18 is then rotated, thereby rotating the drum 20 and shortening the chain. In this manner the shaft 23 is raised until it is disposed within the bifurcated lower portion 22 of the brackets 15. The brackets 15 are provided with pins 28 which secure the shaft against removal on the bifurcated portions of the brackets.

The harvester illustrated in connection with the invention is made much lighter than the ordinary form of harvester, the bull wheel and the grain wheel being eliminated, this elimination permitting the lowering of the binding mechanism and the elimination of a large portion of the frame of the machine. In the present instance, the operative parts of the harvester are carried by a longitudinal frame member 29 illustrated in the form of a pipe, and a transverse frame member 30 which is secured to the frame member 29 and is also formed of tubular or pipe material. The transverse frame member 30 is provided adjacent its opposite ends with rearwardly extending brackets 31 in which are swiveled vertical pivot axles 32 for the supporting and steering wheels 33.

The coupling means or connections between the harvester frame and the tractor frame will next be described, after which the operative driving connections for the various operative parts of the harvester and the steering connections for the harvester will be described in the order named.

As stated above, the frame member or pipe 29 forms the main longitudinal support for the harvester, and this frame member has secured thereto downwardly extending brackets 34 which in turn support transverse frame members 35, these frame members extending laterally of the pipe 29. On their grainward ends the members 35 support the stubbleward end of the platform mechanism, and on their stubbleward ends they support the driving gearing for the binding mechanism. A frame member 36 is secured at its rear end to the stubbleward end of the front frame member 35 and extends forwardly therefrom, being provided at its front end with a suitable aperture adapted to receive the outwardly extending end 26 of the crank arm 24. The outwardly extending end 27 of the crank arm 25 is journaled in the forwardly extending portion of the pipe 29. Suitable cotter pins 37 are provided in the ends 26 and 27 to retain the frame members on the ends of the crank arms.

Tilting mechanism is provided for the purpose of tilting the harvester vertically about the supporting and steering wheels 33 as pivots, this tilting mechanism being embodied in a tilting lever 38 which is pivoted on the forward end of the pipe 29 and is rigidly secured to the crank arm 25 by means of a U-bolt 39 which embraces the crank arm 25 and passes through a bracket 40 formed integral with, or secured to the lever 38. The lever 38 is provided with the usual pawl locking mechanism (not shown) which coacts with a notched sector 41 carried by the pipe 29 to hold the lever in its various adjusted positions. Cushioning means is provided in connection with the tilting mechanism, this means comprising a spring 42 which has secured to its rear end a rod 43 which is adjustably secured to a bracket 44 carried by the pipe 29. The opposite end of the spring 42 has secured thereto a rod 45 which is pivotally connected by means of a link 46 to a downwardly extending portion 47 of the bracket 40. From this description it will be seen that a cushioning or counterbalancing effect is obtained by means of the spring 42, since the lever 38 is locked in adjusted position on the sector 41 and the spring 42 with the link connections with the lever acts to cushion the downward movement of the pipe 29 of the harvester frame.

The transmission mechanism and the operative driving connections for the various operative elements of the harvester will next be described.

As stated above, the stubbleward end of the grain platform is supported on the frame members 35 which in turn are secured to the brackets 34 carried by the pipe 29. The opposite end of the grain platform is adjustably supported on a supporting member 48 pivoted at 49 to a bracket 50 carried by the transverse supporting pipe 30, the opposite end of the support 48 being provided with a locking bolt 51 which passes through a slot 52 formed in a portion of the bracket 31 which carries one of the supporting and steering wheels 33. In order to facilitate the adjustment of the support 48 on its pivot 49, a screw 53 is threaded into a portion of the bracket 31 and engages at its inner end one edge of the upper end of the support 48. When the locking bolt 51 is loosened, the support 48 may be swung about its pivot by adjusting the screw 53 until the desired position of adjustment has been reached. It has been found with the type of harvester described in this specification that the grainward end of the grain platform has a tendency to sag, and for this reason the adjustment above described has been provided to overcome and compensate for any sagging of the platform.

The driving connections for the harvester mechanism illustrated in the drawings are changed only slightly from the ordinary driving gearing, a main drive shaft 54 being journaled in the frame members 35. The shaft 54 is provided adjacent its front end with a crank 55 which is connected with the usual reciprocating cutting apparatus 57 of the harvester by a pitman 56. At its rear end the shaft 54 is provided with a sprocket 58 which is connected by a drive chain 59 in the usual manner with the binding mechanism 60, drive roller 61 for the harvester apron and drive roller 62 for the elevating apron as shown in Fig. 5. These connections need not be described in detail, since no invention per se is claimed therein, and they differ only slightly from the ordinary harvester drive connections. The binding mechanism 60 is carried by the usual pipe 60', which is slidably mounted in brackets 61' carried by the harvester frame, the front end of the pipe being connected by a link 62' to a binder shifting lever 63' which is pivoted on the frame member 36.

The harvester is also provided with the usual reel, and the improved connections for adjusting the reel will next be described.

The reel 63 is carried by the reel shaft 64 which is supported in a bracket 65, the bracket being vertically adjustable on a standard 66. The standard 66 is pivoted at its lower end on a bracket 67, this bracket being secured in a suitable manner to the frame of the harvester. The reel shaft and reel are supported against vertical movement on the standard 66 by means of a lever 68 which is connected at its rear end 69 by link 70 to a bracket 71 secured to a second bracket 72 which in turn is carried by the seat pipe 73 of the harvester. At its front end the lever 68 is provided with the usual pawl locking mechanism 74 which engages suitably spaced apertures in the supporting standard 66 and retains the lever and reel in the desired position of vertical adjustment. The reel may be adjusted forwardly and rearwardly by pulling or pushing on the lever 68, this lever being provided intermediate its rear end, and the reel with a roller 75 which is adapted to engage notches 76 formed in the upper horizontal portion 77 of the bracket 72, the weight of the reel retaining the roller in engagement with any desired notch. Any suitable driving connections for the reel may be provided, and as this driving connection is not claimed per se in this application, a complete showing and description thereof has not been deemed necessary. From the showing in Fig. 1, it will be observed that the front end of the reel adjusting lever 68 is disposed in proximity to the seat of the tractor in a position to be easily operated by the tractor operator.

The front end of the main drive shaft 54 of the harvester is connected by means of a universal coupling 78 to a longitudinally extensible shaft 79 which is provided at its front end with a slip clutch 80. The front portion of the slip clutch 80 is also connected by a universal coupling 81 to a shaft 82, which in turn is connected by suitable gearing 83 to the main transmission shaft 84 of the tractor. The connection between the shaft 82 and the front portion of the universal coupling 81 is illustrated in detail in Figs. 8 and 9, and is important in that it permits the harvester to be disconnected from the tractor easily and quickly. Referring to Figs. 8 and 9, it will be seen that the forward end of the coupling 81 is provided with a longitudinal sleeve portion 85, this sleeve portion having a pair of longitudinal keyways or grooves 86 formed therein. A transverse pin 87 is secured to the rear end of the shaft 82 and is adapted to pass through the keyways or grooves 86 when the coupling 81 is to be operatively connected with shaft 82. The coupling member 81 is provided with a pair of diametrically opposed notches 88 which are disposed at right angles from the rear ends of the grooves 86. When the shaft 82 has been passed through the sleeve 85 it is extended rearwardly to a position in which the pin 87 will be located beyond the coupling member 81, after which the coupling member 81 is turned slightly, whereupon the pin 87 may be positioned in the notches 88. This engagement of the pin with the notches forms the driving connection between the coupling 81 and the shaft 82.

The steering connections between the tractor steering wheels and the harvester steering mechanism will next be described.

The guiding wheels 13 of the tractor are mounted on vertical pivots 89 in the usual manner, these vertical pivots having secured thereto crank arms 90. The arms 90 are connected by a link 91 and suitable connections, such as a crank 92 and link 93, are provided between a steering shaft 94 operated by the steering wheel 14 and the guiding wheels 13. In the present instance, as above stated, a steering connection is also provided between the steering wheels 13 of the tractor and the steering wheels 33 of the harvester, and this steering connection comprises a rod 95 connected by means of a bracket 96 secured to the arms 90 and 92 and at its rear end by chain 97 to the front end of a rod 98. The rod 98, as shown in Fig. 1, is connected at its rear end to a bell crank lever 99 which is secured to the vertical pivot axle 32 of the stubbleward steering wheel 33. The opposite end of the bell crank lever 99 is connected by a longitudinally adjustable rod 100 to a lever arm 101 which is fixedly secured to the vertical pivot axle 32 of the grainward steering wheel 33. Means is provided for maintaining the steering wheels 33 normally in the position illustrated in full lines in Fig. 1, this means comprising a spring 102 secured at 103 to a bracket 104 which is adjustably secured, as shown at 105, to the rod 100. The opposite end of the spring 102 is connected by means of a link 106 to an offset portion 107 formed on the rearwardly extending portion of the bell crank lever 99. From the illustration in Fig. 1, it will be readily seen that the spring 102 normally exerts a force in the stubbleward direction of the rod 100, thereby tending to return the steering wheel 33 to the position shown in Fig. 1.

As stated in the objects of the invention, means has been provided for compensating for the tilting of the harvester and for preventing the steering wheels of the harvester from being thrown out of proper alignment when the harvester is tilted. This compensating means engages the chain 97 which is interposed between the rod 95 and the rod 98, and this mechanism is illustrated particularly in Figs. 1, 2 and 7. The chain 97 is slidably supported in a tubular member 108 carried by the tractor frame, and from the tube 108 passes over the shaft 23 and between the bifurcated outer ends 109 of a forked bracket 110, preferably secured to or formed integral with the bracket 40 of the lever 38. The rod 98 is slidably supported in a suitable bracket 111, carried by the pipe 29. Assuming for illustrative purposes that the harvester frame is adjusted in the horizontal position shown in Fig. 2, it will be evident that if the connection between the tractor steering wheels and the harvester steering wheels is the proper length to operatively connect these members when the harvester is in this position, that this connection will be changed in length when the harvester is tilted to the position shown in Fig. 7, or to an opposite position. This change in length of the connection will obviously cause the steering wheels 33 of the harvester to be swung about their pivot axle, thereby throwing out of adjustment the steering mechanism of the harvester. However, by passing the connecting chain 97 through the apertured outer ends 109 of the fork bracket 110 carried by the bracket 40 of the lever 38, this change in the length of the operative connections is compensated for by the movement of the lever about its pivot, this movement causing a corresponding movement of the chain.

Having described the construction of the implement attachment for tractors and the coupling mechanism for connecting the two machines, we will now briefly set forth the method of connecting the implement to the tractor and the operation of the various parts of the combined machines.

When the implement is detached from the tractor, it will assume substantially the position illustrated in Fig. 7, except that the crank shaft will be detached from the brackets 15 and the chain 97 will be uncoupled from the rod 98 or from the rod 95. Assuming then, that the implement is in this position and that the operator desires to connect the two machines, the chain 21 will be looped around the crank shaft 23, and by rotating the crank 18 the shaft 16 will be rotated, thereby shortening the effective length of the chain 21 and lifting the shaft 23 into position between the bifurcated lower ends of the bracket 15. After the shaft has been lifted to the position illustrated in Figs. 2, 3, and 4, the pins 28 may be placed in position, thereby retaining the shaft against removal. The operator then may connect the coupling member 81 with the power shaft 82 by passing the shaft through the sleeve 85 of the coupling member, and then rotating the shaft 90 degrees to a position in which the transverse pin 87 will engage the notches 88. The chain 97 should then be connected to the rods 95 and 98, it being assumed that the chain has been placed in position between the bifurcated outer ends of the fork 110 carried by the bracket 40 of the lever 38. After these few simple connections have been made, the machines are ready for operation. The operation of the various operative elements of the implement will be clear without further description thereof, since these elements function in the usual manner, and, as stated in this specification, very little change in the construction has been made.

The operation of the steering connections between the tractor and the steering mechanism of the implement will be clear from the diagrammatic showing in Fig. 10, to which attention is directed. When the steering wheel 14 of the tractor is rotated, the connection 93 between the crank 92 of one of the pivot axles 89 of the tractor guiding wheel 13 will communicate this motion to this pivot axle 89, and through the crank 90 and the link 91 to the opposite crank 90 connected to the pivot axle 89 of the other guiding wheel 13. This motion is also communicated through the bracket 96 to the rod 95 and through the chain 97 and rod 98 is communicated to the bell crank lever 99 carried by the pivot axle 32 of the stubbleward steering wheel 33 of the implement. The link connection 100 communicates the movement of the bell crank lever 99 to the crank 101 carried by the pivot axle 32 of the grainward steering wheel 33. As illustrated in Fig. 10, the steering wheels 33 of the implement are rotated on their pivot axles in a direction opposite to the direction of movement of the guiding wheels 13 of the tractor, this movement of the implement steering wheels being similar to that of the steering wheels on wheeled tongue trucks. By moving the steering wheels of the implement in a direction opposite to the direction of movement of steering wheels of the tractor, the implement tends to more quickly align itself with the tractor, thereby decreasing the time required to align the two machines. When the implement is tilted, the engagement of the flexible connection 97 by the bifurcated outer ends 109 of the fork 110 which moves with the lever 38 compensates for this tilting and maintains the steering mechanism of the implement in proper alignment with the steering mechanism of the tractor.

From the above description, it will be seen that the construction of the tractor operating a harvester has been materially decreased in weight, and that the harvester comprises fewer parts and is much simpler in structure, and it will also be seen that we have provided a simple and practical means for easily and quickly connecting the harvester to the tractor and for disconnecting the machines from each other. Attention is also directed to the fact that the coupling means provided between the two machines may be manipulated by a single operator, since the lifting of the forward portion of the harvester is greatly facilitated by the cable and drum which is operated by means of a crank. Tilting mechanism for the harvester has also been designed, this tilting mechanism cooperating with the coupling means to provide a simple and practical mechanism for this purpose. From the description above outlined, it will also be evident that an efficient and practical steering connection between the harvester and the tractor has been provided, and a connection which will not be thrown out of adjustment by the necessary tilting of the harvester. Means has also been provided for making the necessary reel adjustments, and also for adjusting the binding mechanism from the seat of the operator on the tractor.

While we have in the above specification described one embodiment of our invention, it should be understood that the invention is not limited to the particular construction illustrated, but that changes and modifications may be made in the various cooperating parts without departing from the spirit and scope of the invention, as expressed by the following claims.

We claim:

1. In combination, a tractor, an implement, means for coupling the tractor and implement, a shaft carried on the tractor, flexible means connecting the shaft and coupling means, and means for turning said shaft for adjusting the coupling means and implement.

2. In combination, a tractor, an implement, a coupling bar for pivotally connecting the tractor and implement, and means including a shaft carried by the tractor and flexibly connected to the coupling bar for raising and supporting it in position to couple the tractor and implement.

3. In combination, a tractor, an implement, coupling means between said tractor and said implement and means on said tractor for engaging and raising said coupling means as said coupling means is adjusted to coupling position on said tractor.

4. In combination, a tractor, an implement, brackets carried on the tractor, a coupling member carried in the brackets for connecting the implement and tractor, and a drum also carried in the brackets, said drum provided with a cable connected to the coupling member for raising and lowering said coupling member to adjust the implement.

5. In combination, a tractor, an implement, coupling means between said tractor and said implement, brackets carried by said tractor and adapted to receive said coupling means and means carried by said tractor for vertically adjusting said coupling means in said brackets.

6. In combination a tractor, an implement, coupling means between said tractor and said implement, brackets carried by said tractor and having bifurcated lower portions, and means mounted on said tractor for raising said coupling means to coupling position in the bifurcated portions of said brackets.

7. In combination, a tractor, an implement, a coupling member between said tractor and said implement, and means pivoted to said implement and carried by said coupling member for tilting said implement on said coupling member, and means carried by said tractor for lifting said coupling member and connecting the same to said tractor.

8. In combination, a tractor, an implement, a coupling member pivoted on said tractor and operatively connected to said implement, and means rigidly fixed to said coupling member for swinging said coupling member about its pivot on said tractor, thereby tilting said implement.

9. In combination, a tractor, an implement having forwardly extending frame members, a coupling member pivotally connected to the tractor and to the frame members, and means carried on one of the frame members and connected to the coupling member for swinging the coupling member about its pivot to tilt the implement.

10. In combination, a tractor, an implement having forwardly extending frame members, a coupling member pivotally connecting the frame members and tractor, means carried on one of the frame members and connected to the coupling member for tilting the implement, and means for cushioning the implement as it is tilted.

11. In combination, a tractor, an implement having a forwardly extending frame member, a coupling member pivoted to the tractor and to the frame member of the implement, a lever supported on the frame member and secured to the coupling member, whereby the lever may tilt the implement about the pivot of the coupling member, and a cushioning means carried by the frame member for cushioning the implement as it is tilted.

12. In combination, a tractor, an implement having forwardly extending frame members, a crank shaft pivoted on said tractor and having crank arms pivoted to the frame members of said implement, and means on one of the frame members for swinging said crank shaft on its pivot on said tractor.

13. In combination a tractor, an implement having forwardly extending frame members, a crank shaft pivoted on said tractor and having crank arms pivoted to the frame members of said implement, and means carried by one of the frame members of said implement and engaging one of the crank arms for swinging said crank shaft on its pivot.

14. In combination, a tractor, an implement having supporting wheels, coupling means pivoted to said tractor for vertical adjustment only and connected to said implement, and means fixed to said coupling means for tilting said implement about a center to the rear of said implement.

15. In combination, a tractor, steering mechanism carried thereby, an implement positioned in offset relation with respect to said tractor and having steering wheels positioned at the rear thereof, and means for operatively connecting the steering mechanism of the tractor with the steering wheels of said implement.

16. In combination, a tractor, steering mechanism carried thereby, an implement having steering means disposed at the rear thereof, and offset with respect to said tractor and means for operatively connecting the steering mechanism of said tractor with the steering mechanism of said implement.

17. In combination, a tractor, steering mechanism carried thereby, a harvester having a grain platform and cutting apparatus disposed at the front thereof, steering mechanism disposed at the rear of said platform, and flexible connections between the steering mechanism of said tractor and the steering mechanism of said harvester.

18. In combination, a tractor, steering mechanism carried thereby, a harvester having steering wheels disposed at the rear thereof, and operative connections extending beneath said harvester between the tractor steering mechanism and one of the steering wheels of the harvester whereby the tractor steering mechanism and the harvester steering wheels may be operated simultaneously together.

19. In combination, a tractor, steering mechanism carried thereby, an implement having steering mechanism, means for operatively connecting the steering mechanism of said tractor with the steering mechanism of said implement, and resilient means carried by said implement for normally retaining the steering mechanism in a position to direct the harvester in a path parallel to the line of draft.

20. In combination, a tractor, steering mechanism carried thereby, an implement, steering mechanism carried by said implement, operative connections between the steering mechanism of said tractor and the steering mechanism of said implement, means for tilting said implement with respect to said tractor, and means engaging said operative connections for maintaining said steering connections in operative adjustment as said harvester is tilted.

21. In combination, a tractor, steering mechanism carried thereby, an implement having steering mechanism, means for operatively connecting the steering mechanism of said tractor with the steering mechanism of said implement, means for tilting said implement, and means carried by said implement and engaging the operative connections between the steering mechanism of the tractor and the steering mechanism of said implement for maintaining said steering connections in operative adjustment as said implement is tilted.

22. In combination, a tractor, steering mechanism carried thereby, an implement, coupling means between said implement and said tractor, means for tilting said implement with respect to said tractor, steering wheels carried by said implement, means operatively connecting the steering mechanism of said tractor with the steering wheels of said implement, and means carried by said tilting means and engaging the connecting means between the harvester steering mechanism and the steering wheels of said implement for maintaining said connecting means in operative adjustment as said implement is tilted.

23. In combination, a tractor, steering mechanism carried thereby, an implement having steering mechanism, means for tilting said implement with respect to said tractor, operative connections between the steering mechanism of said tractor and the steering mechanism of said harvester and including a flexible member, and means carried by the tilting means of said implement and engaging said flexible member for maintaining the steering mechanism of said implement in proper adjustment when said implement is tilted.

24. In combination, a tractor, an implement, a coupling member connecting the tractor and implement, a lever pivoted on the implement and movable in a vertical plane parallel longitudinally with respect to the tractor, and means securing the lever to the coupling member for maintaining the lever in said plane and adjusting the coupling member.

25. In combination, a tractor, steering mechanism carried thereby, a harvester having steering mechanism, flexible means for connecting said tractor steering mechanism with said harvester steering mechanism for steering the harvester in one direction, and means carried by said harvester for steering the harvester in the other direction.

26. In combination, a tractor, steering mechanism carried thereby, a harvester having steering mechanism, flexible means for connecting said tractor steering mechanism with said harvester steering mechanism for steering the harvester in one direction, and resilient means carried by said harvester for steering the harvester in the other direction.

In testimony whereof we affix our signatures.

BERT R. BENJAMIN.
WILLIAM WEBBER.

CERTIFICATE OF CORRECTION.

Patent No. 1,643,149.  Granted September 20, 1927, to

BERT R. BENJAMIN.

It is hereby certified that error appears in the printed specification of the above numbered patent requiring correction as follows: Page 1, line 17, for the word "aid" read "and"; page 6, line 40, claim 7, strike out the word "and" second occurence; same page, line 116, claim 16, after the word "thereof" strike out the comma, and insert the same after the word "tractor" line 117, same claim; and that the said Letters Patent should be read with these corrections therein that the same may conform to the record of the case in the Patent Office.

Signed and sealed this 24th day of January, A. D. 1928.

Seal.

M. J. Moore,
Acting Commissioner of Patents.